March 10, 1970 R. L. GARRATT 3,499,579
DEVICE FOR INTRODUCING SPRAY INTO AIR TREATMENT SYSTEMS
Filed April 4, 1968
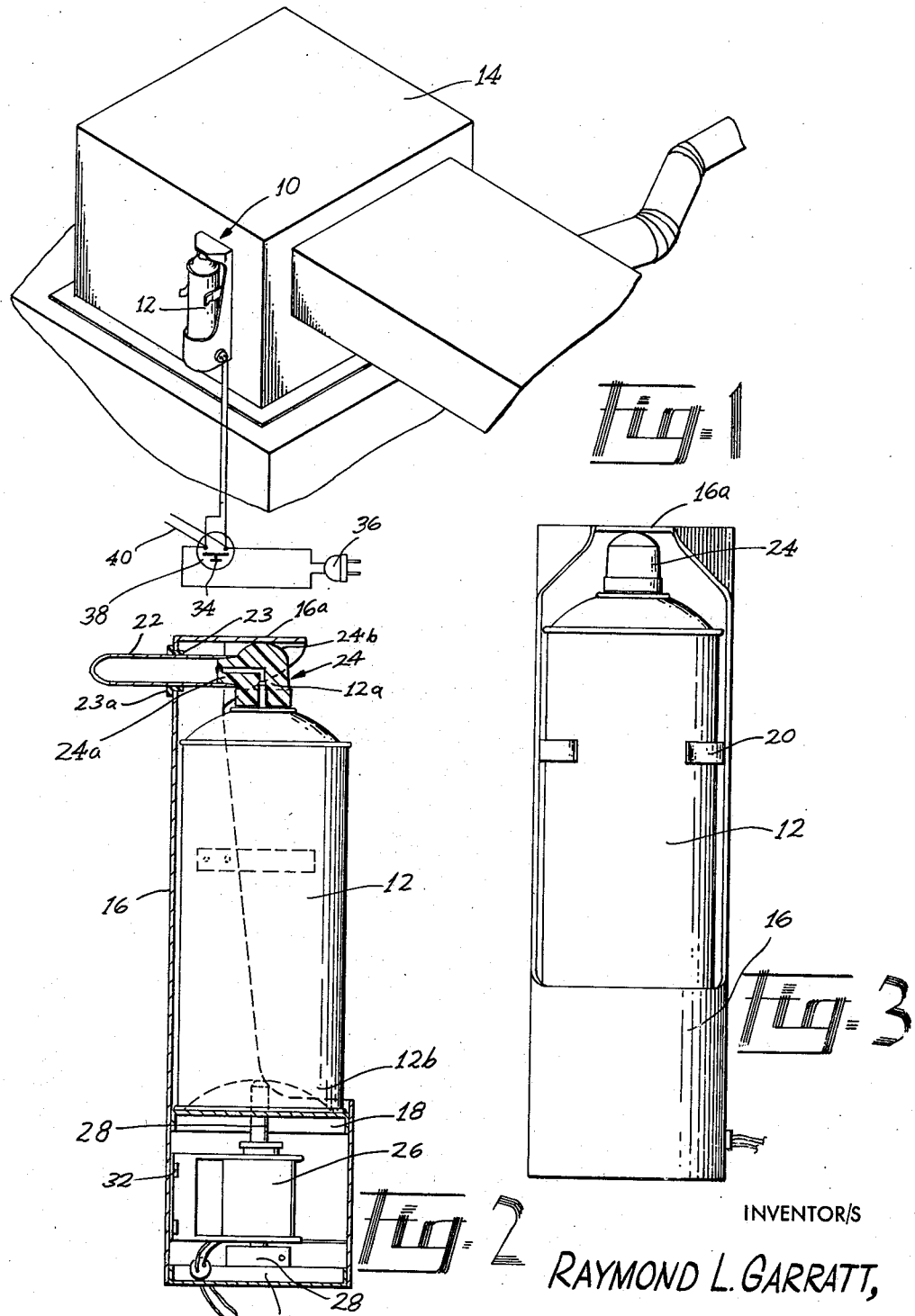
INVENTOR/S
RAYMOND L. GARRATT,
BY Melville, Strasser, Foster and Hoffman
ATTORNEYS United States Patent Office 3,499,579
Patented Mar. 10, 1970

3,499,579
DEVICE FOR INTRODUCING SPRAY INTO AIR TREATMENT SYSTEMS
Raymond L. Garratt, 177 Caldwell Drive, Cincinnati, Ohio 45216
Filed Apr. 4, 1968, Ser. No. 718,716
Int. Cl. B67d 5/08
U.S. Cl. 222—54                                  5 Claims

ABSTRACT OF THE DISCLOSURE

A device for introducing odor removing chemical spray, scented air freshener, bug killer and the like from a pressurized spray container, of the type having a dispensing valve at one end which is operative by relative movement of the container and the valve axially, into the forced air stream of an air treatment system, such as a furnace or air conditioning unit. The device comprises means for connecting the pressurized container to the forced air stream of the air treatment system and means for moving the container axially so as to depress the dispensing valve and thereby introduce the spray into the forced air stream of the air treatment system.

BACKGROUND OF THE INVENTION

Field of the invention

The invention relates to commercial or residential furnaces or air conditioners or to any air treatment system which produces a forced air stream, and in particular, to the introduction of odor removing chemical spray, scented air freshener, bug killer and the like from a pressurized spray container, of the type having a dispensing valve at one end which is operative by relative movement of the container and the valve axially, into the forced air stream of an air treatment system.

Description of the prior art

The prior art teaches the making of a number of devices for deodorizing air in the room in which the device is installed. However, these devices are undesirable for use with an air treatment system, as they have been developed solely for wall-mounting and the emission of spray into the atmosphere.

United States Letters Patent No. 3,044,276, in the name of F. Kauten, patented July 17, 1962, discloses an apparatus for emitting chemical spray into the forced air stream of an air treatment system wherein liquid from non-pressurized containers is gravity fed into an atomizer. A separate air pump is employed to mix air and the chemical liquid together so as to produce a spray. The unit also includes a timer. In order to extract the spray from the unit and to introduce it into the forced air stream of an air treatment system, the unit utilizes suction pressure from the air treatment system.

While the Kauten apparatus seems to be desirable for large commercial air treatment systems, such as extremely large furnaces or air conditioners for multi-story office or apartment buildings, it has proven to be much too expensive and impractical for use in connection with smaller air treatment systems such as found in residential homes.

SUMMARY OF THE INVENTION

The present invention provides a device for introducing odor removing chemical spray, scented air freshener, bug killer and the like from a pressurized spray container, of the type having a dispensing valve at one end thereof which is operative by relative movement of the container and the valve axially, into the forced air stream of an air treatment system.

Broadly speaking, the device comprises means for connecting the container to the forced air stream of the air treatment system and means for moving the container axially so as to depress the valve and introduce the spray into the forced air stream of the air treatment system.

The means for connecting the container to the air stream of the air treatment system may comprise a flexible spray tube and the means for moving the container axially may comprise a solenoid coil, a solenoid plunger contiguous with the other end of the container, and control actuating means whereby the coil is energized and deenergized as desired. The control actuating means may be a simple push button wired to any suitable electrical source. The push button may also be in combination with a thermostat or wired in interlocking arrangement with the air treatment system, whereby the spray is precluded from being introduced into the air treatment system in the event there is not a forced air stream therein when the push button is depressed.

In lieu of a spray tube, the means for connecting the container to the air stream of the air treatment system may comprise a holder for receiving the pressurized container, the holder including therein means for positioning the container such that the dispensing end thereof is in close relation with one end of the holder. The solenoid coil and the solenoid plunger are located at the other end of the holder such that the solenoid plunger is contiguous with the non-dispensing end of the container. A spray tube may be mounted on the holder in alignment with the dispensing valve of the container and in communication with the forced air stream of the air treatment system. A plunger having a tapered nozzle and a rounded body portion is within the holder such that the tapered nozzle is disposed in the end of the spray tube and the rounded body portion receives the dispensing valve of the container. The plunger is continguous with the one end of the holder.

The spray tube and plunger may, of course, be integral, and retainers clips positioned on the sides of the holder may be utilized to retain the pressurized container therein. Finally, the means within the holder for positioning the container therein may comprise a support base on which the non-dispensing end of the container is supported, said base having an aperture therein for receipt of the solenoid plunger.

The device of the present invention for introducing spray into air treatment systems is practical, efficient and has been found to be very successful in introducing spray from a conventional pressurized spray container into the air stream of small air treatment systems, such as a residential furnace or air conditioners. In practice, the device of the present invention may be manufactured in a price range suitable to satisfy the residential market, as opposed to prior art devices which introduce chemical spray into large air treatment systems such as furnaces and air conditioning systems in commercial office and apartment buildings.

BRIEF DESCRIPTION OF THE DRAWING

FIGURE 1 is a perspective view illustrating the use of the device of the present invention for introducing spray into the forced air stream of an air treatment system.

FIGURE 2 is a side elevation, partially in cross section of the device of this invention with a pressurized can positioned therein.

FIGURE 3 is a further elevational view of the device of this invention with a pressurized can positioned therein.

DESCRIPTION OF THE PREFERRED EMBODIMENTS

Referring now in more detail to the drawings, FIGURE 1 shows a preferred embodiment of the device 10 of the present invention for introducing odor removing chemical spray, scented air freshener, bug killer and the from a pressurized spray container 12 into the forced air stream of an air treatment system 14, such as, for example, a residential furnace or air conditioner.

The pressurized spray container 12 is of the type having a dispensing valve at one end thereof which is operative by relative movement of the container and valve axially.

As can be seen from FIGURES 2 and 3, the spray device of this invention includes a holder 16 which receives the pressurized container 12. The pressurized container 12 is preferably positioned within the holder 16 such that the dispensing end 12a of the container 12 is in close relation with one end of the holder 16a. In practice, the non-dispensing end 12b of the container 12 rests upon a support base 18. The base 18 may be provided with a raised portion on which the recessed non-dispensing end of the container 12 may be placed. The retaining clips 20 positioned on the sides of the holder 16 further aid in retaining the pressurized container in its proper position within the holder.

The holder 16 may, of course, be in one piece or it may have separate side panels and other construction features as desired.

A spray tube is mounted on the holder 16 in alignment with the dispensing end 12a of the container 12. A flange ring 23 acts as a tube retainer, and the rubber washer 23a acts as an air seal once the unit is installed. The spray tube 22 is preferably straight and cut at a very shallow angle in the nature of 15°. A plunger 24 is located within the holder 16 contiguous with the end 16a thereof. The end 16a may be suitably reinforced if necessary. The plunger has a tapered nozzle 24a and a rounded body portion 24b. When the pressurized container 12 is properly positioned within the holder 16 the body portion 24b of the plunger 24 receives the dispensing end 12a of the container 12 and the tapered nozzle 24b of the plunger 24 is disposed in the end of the spray tube 22.

It should be noted that the plunger 24 may be adapted to receive the operating plug of dispensing valves of commercial containers. However, should the operating plugs of certain commercial containers be unacceptable, they may be removed therefrom and a suitable operating plug may either be inserted therefor or may be made integral with the plunger 24, as is shown in FIGURES 2 and 3.

It will also be obvious that the spray tube 22 and the plunger 24 may be made in one integral piece.

The lower portion of the holder 16 houses a solenoid coil 26 having a solenoid plunger 28. As can be seen, the solenoid rests upon a solenoid housing base plate 30 and retaining rivets 32 hold the solenoid coil in the proper position. The support base 18 is provided with a centrally located mouthed hole which allows the solenoid plunger 28 to extend therethrough.

The solenoid coil 26 is energized and deenergized by any suitable control actuating means. Preferably, the control actuating means will comprise a push button 34 wired to any suitable electrical source 36. The push button may, of course, be in combination with a thermostat 38 which controls the operation of the air treatment system 14. Additionally, the push button 34 may be wired in an interlocking arrangement, such as at 40, with the air treatment system 14. The interlocking arrangement thereby precludes spray from being introduced into the air treatment system in the event that there is not a forced air stream therein when the push button 34 is depressed.

In operation, the push button 34 is depressed, energizing the solenoid coil 26. This causes the solenoid plunger 28 to push upwardly against the non-dispensing end 12b of the pressurized container 12. Such action forces the plunger 24 against the holder top 16a. This, of course, depresses the operating plug, causing spray to be introduced through the spray tube 22 and into the forced air stream of the air treatment system 14.

It will, of course, be obvious that when all of the spray of a pressurized can 12 has been introduced into the air treatment system 14, the can may easily be replaced.

While certain preferred embodiments of the invention have been specifically illustrated and described, it is understood that the invention is not limited thereto, as many variations will be apparent to those skilled in the art.

The embodiments of the invention in which an exclusive property or privilege is claimed are defined as follows:

1. A device for introducing odor removing chemical spray, scented air freshener, bug killer and the like from a pressurized spray container, of the type having a dispensing valve at one end thereof which is operative by relative movement of the container and the valve axially, into the forced air stream of an air treatment system, which comprises a holder for receiving said pressurized container, said holder including therein a support base on which the non-dispensing end of said container is supported such that the dispensing end thereof is in close relation with one end of said holder, means for moving said container axially, including a solenoid coil, a solenoid plunger and control actuating means for energizing and de-energizing said coil as desired, said base having an aperture therein for receipt of said solenoid plunger such that said solenoid plunger is contiguous with the non-dispensing end of said container; a flexible spray tube mounted on said holder in alignment with said dispensing valve of said container and in communication with the forced air stream of said air treatment system; and a plunger within said holder contiguous with one end thereof and having a tapered nozzle and a rounded body portion, said body portion receiving said dispensing valve of said container and said tapered nozzle being disposed in the end of said spray tube, whereby as said coil is energized, said plunger moves said pressurized container axially within said holder such that the dispensing valve thereof pushes against the rounded body portion of said plunger and chemical spray is discharged from said container through the tapered nozzle of said plunger into said flexible spray tube then into said air treatment system.

2. The device according to claim 1, wherein said control actuating means comprises a push button wired to any suitable electrical source.

3. The device according to claim 1, wherein said push button is wired in interlocking arrangement with said air treatment system, whereby the spray is precluded from being introduced into said air treatment system in the event there is not a forced air stream therein when said push button is depressed.

4. The device according to claim, wherein said push button is in combination with a thermostat.

5. The device according to claim 1, wherein retainer clips positioned on the sides of said holder retain said pressurized container therein.

References Cited

UNITED STATES PATENTS

| | | | |
|---|---|---|---|
| 2,991,912 | 7/1961 | Thomas et al. | 222—70 |
| 3,158,081 | 11/1964 | Frost | 239—70 X |
| 3,228,562 | 1/1966 | Brown | 222—70 |

FOREIGN PATENTS

| | | |
|---|---|---|
| 1,320,909 | 2/1963 | France. |

STANLEY H. TOLLBERG, Primary Examiner

U.S. Cl. X.R.

98—30